(12) United States Patent
Berkemeier et al.

(10) Patent No.: US 11,148,667 B2
(45) Date of Patent: Oct. 19, 2021

(54) AUTOMATED REVERSING BY CHOICE OF TARGET LOCATION

(71) Applicant: Continental Automotive Systems, Inc., Auburn Hills, MI (US)

(72) Inventors: Matthew Donald Berkemeier, Beverly Hills, MI (US); Xin Yu, Wuhu -Jiujiang (CN); Danny Bynum, Lake Orion, MI (US); Julien Ip, Madison Heights, MI (US); Kyle P Carpenter, Rochester, MI (US); Eduardo Llanos, Auburn Hills, MI (US); Dhiren Verma, Farmington Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/530,933

(22) Filed: Aug. 2, 2019

(65) Prior Publication Data

US 2020/0039517 A1 Feb. 6, 2020

Related U.S. Application Data

(60) Provisional application No. 62/714,419, filed on Aug. 3, 2018.

(51) Int. Cl.
*B60D 1/36* (2006.01)
*B60W 30/18* (2012.01)
*G05D 1/02* (2020.01)

(52) U.S. Cl.
CPC ..... *B60W 30/18036* (2013.01); *G05D 1/0231* (2013.01); *B60D 1/36* (2013.01);
(Continued)

(58) Field of Classification Search
CPC ..... B60W 30/18036; B60W 2540/215; B60W 2554/801; B60W 2420/42;
(Continued)

(56) References Cited

U.S. PATENT DOCUMENTS

2014/0012465 A1  1/2014  Shank et al.
2016/0288601 A1  10/2016  Gehrke et al.
(Continued)

OTHER PUBLICATIONS

The International Search Report and the Written Opinion of the International Searching Authority dated Nov. 15, 2019 for corresponding PCT Application No. PCT/US2019/045080.

*Primary Examiner* — Peter D Nolan
*Assistant Examiner* — Ashley L Redhead, Jr.

(57) ABSTRACT

A method of autonomously maneuvering a tow vehicle towards a trailer positioned behind the tow vehicle is provided. The method includes receiving one or more images from a camera positioned on a back portion of the tow vehicle. The method also includes receiving, at the data processing hardware, a first user selection of a trailer representation within the one or more images. The method includes sending first instructions to a drive system causing the tow vehicle to autonomously maneuver towards the trailer associated with the first user selection of the trailer representation. The method also includes receiving a second user selection of a coupler representation within the one or more images. The coupler representation associated with a trailer coupler of the trailer. The method also includes sending second instructions to the drive system causing the tow vehicle to autonomously maneuver towards the trailer coupler associated with the second user selection.

15 Claims, 6 Drawing Sheets

(52) U.S. Cl.
CPC ..... *B60W 2420/42* (2013.01); *B60W 2540/18* (2013.01); *B60W 2540/215* (2020.02); *B60W 2554/801* (2020.02); *G05D 2201/0213* (2013.01)

(58) Field of Classification Search
CPC .......... B60W 2540/18; B60W 2300/14; G05D 1/0231; G05D 2201/0213; G05D 1/0225; B60D 1/36; B60D 1/06; B60D 1/62
See application file for complete search history.

(56) References Cited

U.S. PATENT DOCUMENTS

| | | | |
|---|---|---|---|
| 2016/0304122 A1 | 10/2016 | Herzog et al. | |
| 2016/0378118 A1* | 12/2016 | Zeng | B60D 1/62 701/28 |
| 2019/0389262 A1* | 12/2019 | Niewiadomski | B60R 11/04 |

* cited by examiner

AUTOMATED REVERSING BY CHOICE OF TARGET LOCATION

CROSS REFERENCE TO RELATED APPLICATIONS

This U.S. patent application claims priority under 35 U.S.C. § 119(e) to U.S. Provisional Application 62/714,419, filed on Aug. 3, 2018, which is hereby incorporated by reference in its entirety.

TECHNICAL FIELD

This disclosure relates to a method and device for automated reversing of a tow vehicle towards a selected target location.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Recent advancements in sensor technology have led to improved vehicle autonomous driving. As such, it is desirable to provide an automated vehicle reverse system that is capable of maneuvering towards the trailer for hitching the vehicle to the trailer.

SUMMARY

One aspect of the disclosure provides a method of autonomously maneuvering a tow vehicle towards a trailer positioned behind the tow vehicle. The method includes receiving, at data processing hardware, one or more images from a camera positioned on a back portion of the tow vehicle and in communication with the data processing hardware. The method includes receiving, at the data processing hardware, a first user selection of a trailer representation within the one or more images. The first user selection may include a trailer bounding box surrounding the trailer representation. The method also includes sending, from the data processing hardware to a drive system in communication with the data processing hardware, first instructions causing the tow vehicle to autonomously maneuver in a rearward direction towards the trailer associated with the first user selection of the trailer representation. The method also includes receiving, at the data processing hardware, a second user selection of a coupler representation within the one or more images, the coupler representation associated with a trailer coupler of the trailer. The second user selection may include a coupler bounding box surrounding the coupler representation. Additionally, the method includes sending, from the data processing hardware to the drive system, second instructions causing the tow vehicle to autonomously maneuver in the rearward direction towards the trailer coupler associated with the second user selection of the coupler representation.

Implementations of the disclosure may include one or more of the following optional features. In some implementations, the method includes tracking the trailer bounding box within the one or more images as the tow vehicle autonomously maneuvers in the rearward direction towards the trailer associated with the first user selection of the trailer representation. The method may also include tracking the coupler bounding box within the one or more images as the tow vehicle autonomously maneuvers in the rearward direction towards the trailer coupler associated with the second user selected of the coupler representation. In some examples, the method includes receiving wheel tick sensor data and steering wheel angle data from a sensor system in communication with the data processing hardware. The method includes determining a vehicle position based on the wheel tick sensor data and the steering wheel angle data, and adjusting the first and/or second instructions based on the tow vehicle position relative to the trailer and the coupler respectively.

In some implementations, the method includes determining a tow ball position of a tow ball of the tow vehicle. During autonomous maneuver of the tow vehicle in the rearward direction, the method includes determining a longitudinal distance and a lateral distance between the tow ball position and a center of a trailer bounding box or a coupler bounding box, where the center is a center of a bottom of the trailer bounding box or the coupler bounding box. The first and second instruction cause the longitudinal distance and the lateral distance to be decreased.

Another aspect of the disclosure provides a system for autonomously maneuvering a tow vehicle towards a trailer positioned behind the tow vehicle. The system includes: data processing hardware; and memory hardware in communication with the data processing hardware. The memory hardware stores instructions that when executed on the data processing hardware cause the data processing hardware to perform operations that include the methods described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
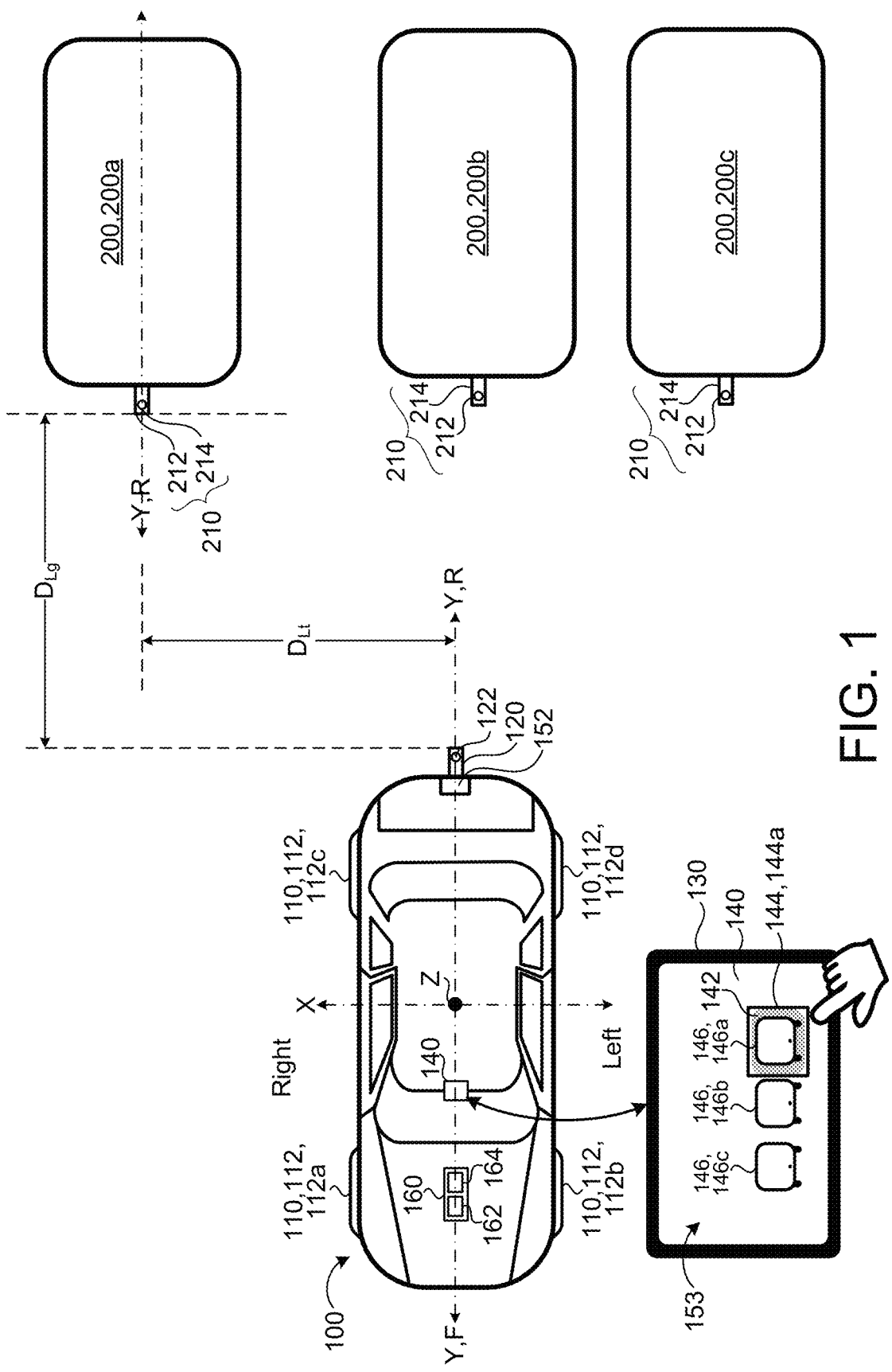
FIG. 1 is a schematic top view of an exemplary tow vehicle at a distance from trailers positioned behind the tow vehicle.

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. Manually backing up to a trailer may need a lot of effort from the driver. The driver must constantly monitor a rear vehicle camera and steer the vehicle to bring the tow ball of the vehicle underneath the coupler of a trailer. Therefore, it is desirable to have a tow vehicle that is capable of autonomously backing up towards a driver specified position, for example a trailer, identified from an image of the rearward environment of the vehicle and displayed on a user interface, such as a user display.

Referring to FIGS. 1-6, in some implementations, a driver of a tow vehicle 100 wants to tow a trailer 200 positioned behind the tow vehicle 100. The tow vehicle 100 may be configured to receive an indication of a driver selection 142 associated with a selected trailer 200, 200a-c. The driver selection 142 may be a bounding box 144a around a trailer representation 146 or a coupler representation 502. In some examples, the driver positions the tow vehicle 100 such that the trailer 200 is behind the tow vehicle 100, which allows the tow vehicle 100 to autonomously maneuver towards the selected trailer 200. In some examples, the tow vehicle 100 autonomously maneuvers towards the selected trailer 200 and stops at a first pre-determined distance away from the trailer 200 such that a representation 502 of the trailer coupler 212 is close enough to be clearly visible on a user display 140, for example at a line 400. The driver may then select the location of the coupler representation on the display 140, which may be facilitated by a zoom feature, e.g., zoom in/out, enabling a higher level of precision in the selection of the coupler representation. Once the driver confirms the selection of the coupler representation 502, the tow vehicle 100 autonomously maneuvers in a rearward direction R towards the coupler 212. The tow vehicle 100 may stop at a second predefined distance being, for example, within few inches or centimeters from the coupler 212, allowing the driver to manually complete the hitching of the tow vehicle 100 with the trailer 200. In other examples, the tow vehicle 100 automatically hitches to the trailer 200.

The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 118 may be configured to adjust a height of the tow vehicle 100 allowing a tow vehicle hitch 120 (e.g., a tow vehicle tow ball 122) to align with a trailer hitch 210 (e.g., trailer hitch coupler 212 and a trailer hitch bar 214), which allows for autonomous connection between the tow vehicle 100 and the trailer 200.

The tow vehicle 100 may move across the road surface 10 by various combinations of movements relative to three mutually perpendicular axes defined by the tow vehicle 100: a transverse axis X, a fore-aft axis Y, and a central vertical axis Z. The transverse axis x extends between a right side and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 118 adjusts the suspension of the tow vehicle 100, the tow vehicle 100 may tilt about the X axis and or Y axis, or move along the central vertical axis Z.

The tow vehicle 100 may include a user interface 130. The user interface 130 may include the display 140, a knob 132, and a button 134, which are used as input mechanisms. In some examples, the display 140 may show the knob 132 and the button 134. While in other examples, the knob 132 and the button 134 are a knob button combination. In some examples, the user interface 130 receives one or more driver commands from the driver via one or more input mechanisms or a touch screen display 140 and/or displays one or more notifications to the driver. The user interface 130 is in communication with a vehicle controller 160, which is in turn in communication with a sensor system 150. In some examples, the display 140 displays an image 151 of an environment of the tow vehicle 100 leading to one or more commands being received by the user interface 130 (from the driver) that initiate execution of one or more behaviors. In some examples, the user display 140 displays an image 151 of the rearward environment of the tow vehicle 100. In this case, the driver can select a position within the image 151 that is indicative of the environment (i.e., the trailer 200) that the driver wants the vehicle to autonomously maneuver towards. In some examples, the user display 140 displays one or more representations 146 of trailers 200 positioned behind the tow vehicle 100 and the driver selects a representation 146 of a trailer 200 that the driver wants the tow vehicle 100 to maneuver towards.

The tow vehicle 100 may include the sensor system 150 to provide reliable and robust driving. The sensor system 150 may include different types of sensors that may be used separately or with one another to create a perception of the environment of the tow vehicle 100 that is used for the tow vehicle 100 to drive and aid the driver in make intelligent decisions based on objects and obstacles detected by the sensor system 150.

The sensor system 150 may include the one or more cameras 152 supported by the tow vehicle 100. In some implementations, the tow vehicle 100 includes a rear camera 152 that is mounted to provide a view of a rear-driving path for the tow vehicle 100. The rear camera 152 may include a fisheye lens that includes an ultra wide-angle lens that produces strong visual distortion intended to create a wide panoramic or hemispherical image. Fisheye cameras capture images having an extremely wide angle of view. Moreover, images captured by the fisheye camera have a characteristic convex non-rectilinear appearance. Other types of cameras may also be used to capture images of the rear of the tow vehicle 100. As previously described, the images 151 captured by the rear camera 152 are displayed on the display 140 and show a rear environment of the tow vehicle 100 that include one or more trailer representations 146, 146a-c of the one or more trailers 200, 200a-c positioned behind the tow vehicle 100.

In some examples, the sensor system 150 also includes one or more wheel encoders 154 associated with one or more wheels 112, 112a-d of the tow vehicle 100. The wheel encoder 154 is an electro-mechanical device that converts an angular position or motion of the wheel to analog or digital output signals. Therefore, the wheel encoder 154 determines the speed and distance the wheel 112, 112a-d has traveled. The sensor system 150 may also include a steering wheel angle sensor 156 that measures a steering wheel data 157 such as position angle and rate of turn of the steering wheel.

The sensor system 150 may also include other sensors 158 that detect the vehicle motion, i.e., speed, angular speed, position, etc. The other sensors 158 may include an inertial measurement unit (IMU) configured to measure the vehicle's linear acceleration (using one or more accelerometers) and rotational rate (using one or more gyroscopes). In some examples, the IMU also determines a heading reference of the tow vehicle 100. Therefore, the IMU determines the pitch, roll, and yaw of the tow vehicle 100. In some examples, the other sensors 158 may include radar sensors configured to determine a range, angle, or velocity of objects (e.g., the trailer 200). The radar sensors 158 transmit radio signals and measure the time it takes for a reflection of the transmitted signal to return. The radar sensors determine a distance to the object as one-half the round-trip time multiplied by the speed of the signal. The radar sensors may also determine a speed of the tow vehicle 100. The speed may be based on a distance from the radar sensors 158 to the object at a first time, and a distance from the radar sensors 158 to the object at a second time. Therefore, the radar sensors 158 may determine the speed based on a difference between the distances at the first and second time divided by the difference between the first and second time. The other sensors 158 may include, but are not limited to, sonar, LIDAR (Light Detection and Ranging, which can entail optical remote sensing that measures properties of scattered light to find range and/or other information of a distant target), LADAR (Laser Detection and Ranging), ultrasonic, etc.

The vehicle controller 160 includes a computing device (or processor) 162 (e.g., central processing unit having one or more computing processors) in communication with non-transitory memory 164 (e.g., a hard disk, flash memory, random-access memory) capable of storing instructions executable on the computing processor(s) 162. In some examples, the vehicle controller 160 executes a hitch assist system 170 and a drive assistance system 190.

In some examples, the hitch assist system 170 determines a destination (e.g., a selected trailer 200) for the tow vehicle 100 to autonomously drive towards. The hitch assist system 170 receives images 151 from the camera 152 and/or sensor data 153 from the one or more sensors 154-158 and determines a location of the trailer 200, identified by the driver via the user interface 130, with respect to the tow vehicle 100, for example, a longitudinal distance $D_{Lg}$, a lateral distance $D_{Lt}$, a vertical distance $H_{Ca}$ and/or an angle between the camera 152 and a front face of the trailer 200 or the trailer coupler 212. In addition, in some examples, the hitch assist system 170 also determines an angle (not shown) between the tow vehicle 100 and the trailer 200, i.e., an angle between the vehicle hitch 160 and the trailer hitch 210 or the front face of the trailer 200. The longitudinal distance $D_{Lg}$, the lateral distance $D_{Lt}$, and the vertical distance $H_{Ca}$ may be used by the driver while backing up the tow vehicle 100 towards the trailer 200 or while the tow vehicle 100 is autonomously maneuvering towards the trailer 200.

Figure 2:
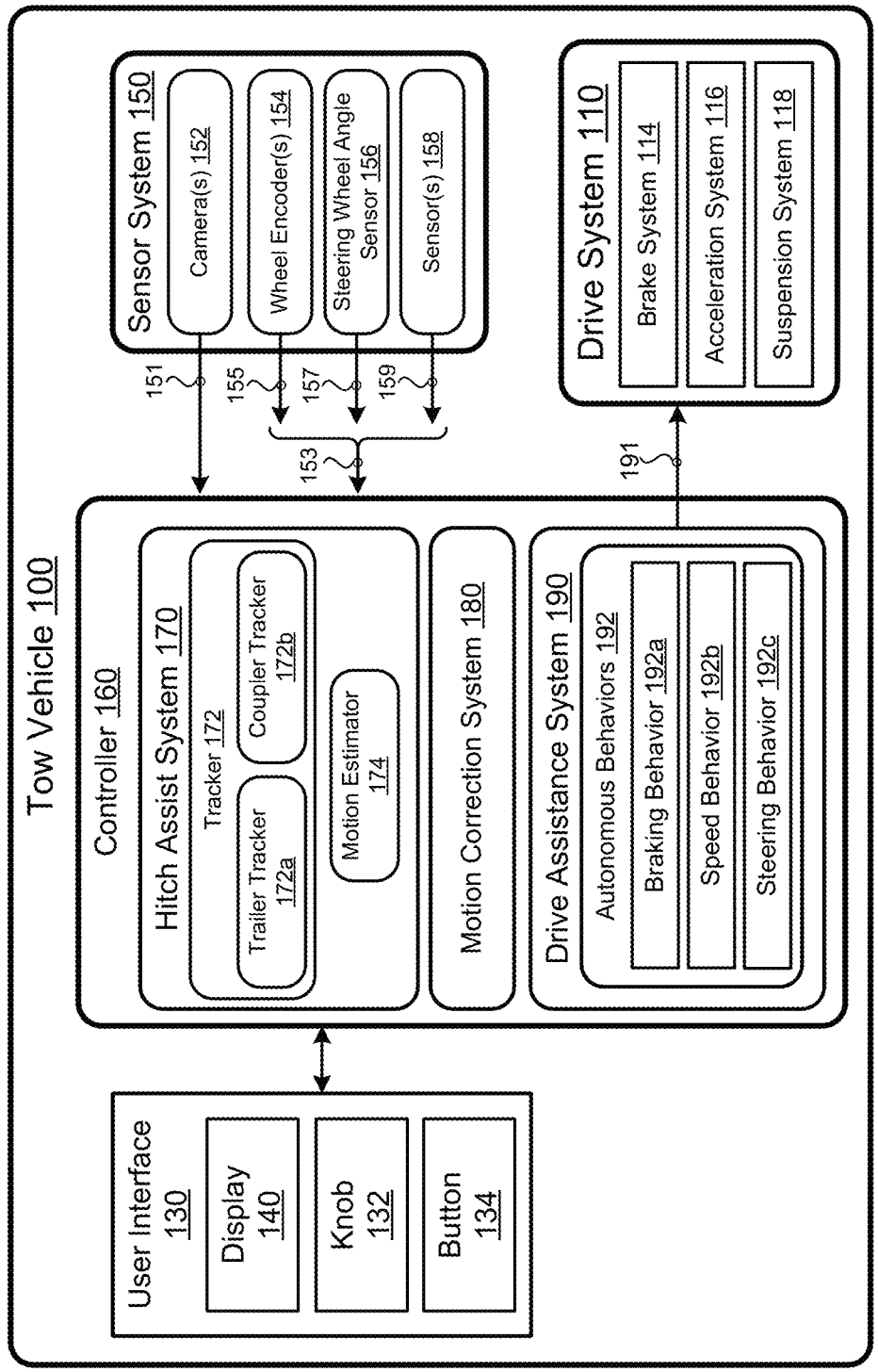
FIG. 2 is a schematic view of an exemplary tow vehicle of FIG. 1.
Figure 3:
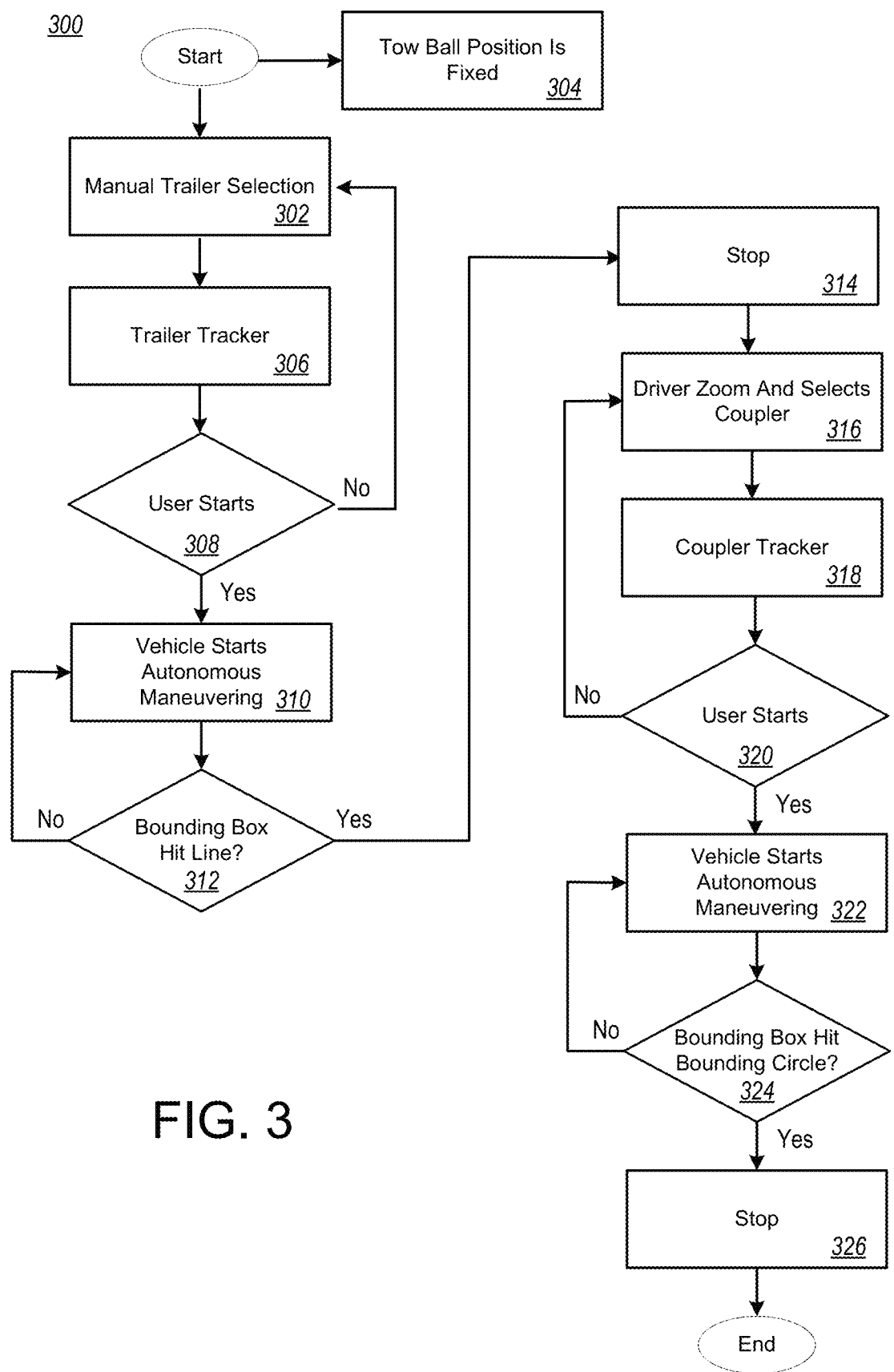
FIG. 3 are schematic views of an exemplary flowchart of a method for maneuvering the vehicle in a rearward direction toward a driver selected trailer.

Referring to FIGS. 2 and 3, in some implementations, the hitch assist system 170 includes a tracker 172 having a trailer tracker 172a and a coupler tracker 172b. The trailer tracker 172a is configured to track the trailer 200, e.g., a front face 202 of the trailer 200, and the coupler tracker 172b is configured to track the trailer coupler 212 while the tow vehicle 100 autonomously maneuvers towards the trailer 200 in the rearward R direction.

Figure 4:
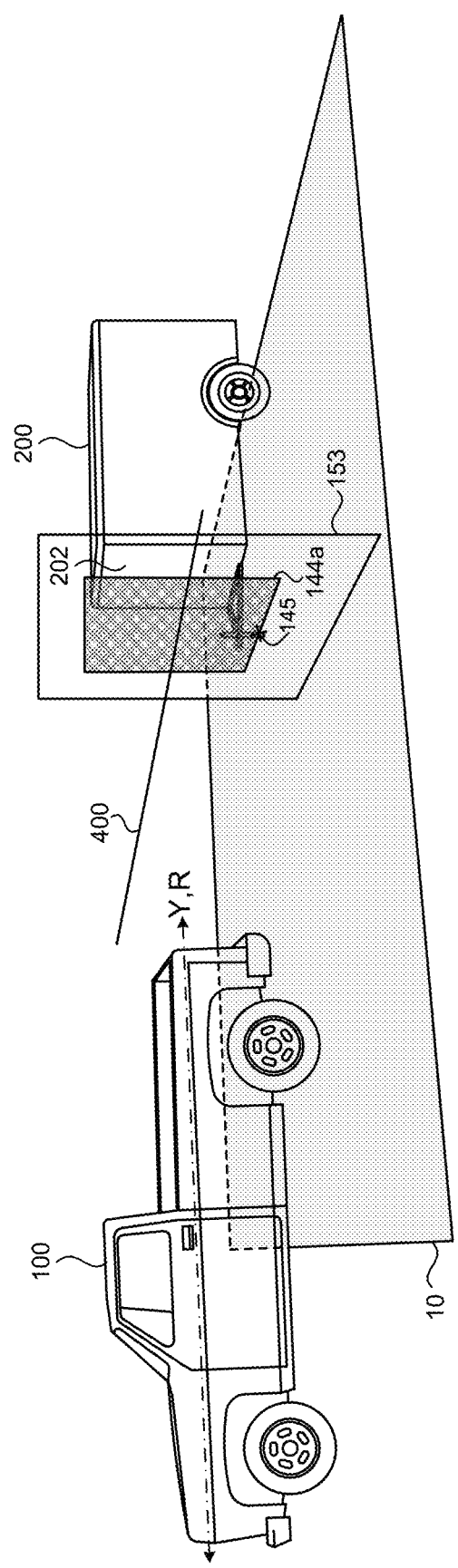
FIG. 4 is a schematic view of a trailer bounding box within an image.
Figure 5B:
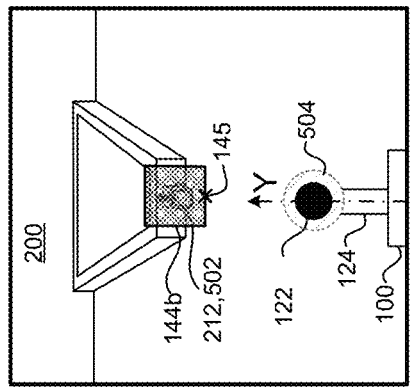
FIGS. 5A and 5B are schematic views of a coupler bounding box within an image.
Figure 5A:
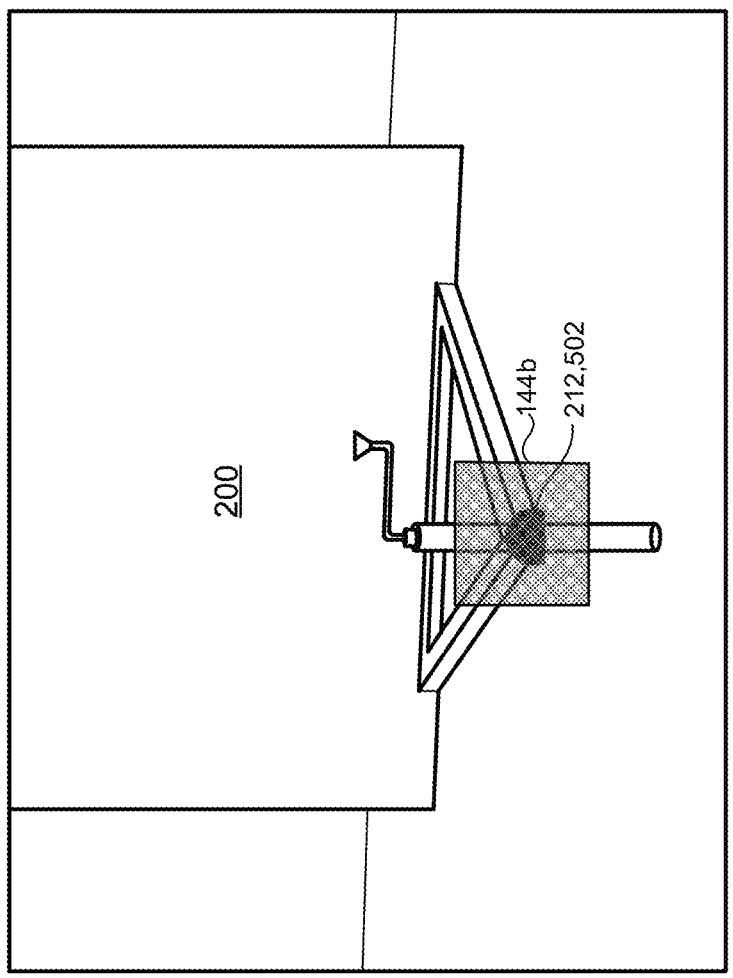

FIG. 3 illustrates a flow chart 300 for the steps executed by the controller 160 causing the tow vehicle 100 to autonomously maneuver towards the driver selected trailer 200. At block 302, the driver initiates execution of the hitch assist system 170 by way of the user interface 130. The display 140 displays images 151 received from the rear camera 152 that include a rearward view of the tow vehicle 100. The driver may manually enter or draw a trailer bounding box 144a around a selected trailer representation 146a associated with a trailer 200 from the one or more trailers 200, 200a-c positioned behind the tow vehicle 100. At block 304, the hitch assist system 170 determines a position of the vehicle tow ball 122 in real world coordinates or relative to the camera 152. In other examples, the hitch assist system 170 may retrieve the position of the vehicle tow ball 122 from memory hardware 164. At block 306, the trailer tracker 172a identifies the location of the trailer representation 146a within the image 151 based on the selected trailer bounding box 144a and tracks the trailer 200 (i.e., face 202 of the trailer 200) while the tow vehicle 100 is moving backwards. At block 308, the driver indicated that his selection of the trailer representation is complete by way of the user interface 130 or the driver puts the tow vehicle 100 in reverse gear causing the tow vehicle 100 to start its autonomous maneuvering towards the trailer 200 associated with the trailer representation 146a within the trailer bounding box 144a. During the autonomous maneuvering, the motion correction system 180 determines and implements corrective steering angles that maintain that the vehicle 100 maneuvers towards the trailer bounding box 144a based on data provided by the trailer tracker 172a. In some examples, the trailer tracker 172a considers the fore-aft axis Y of the tow vehicle 100 and a bounding box center 145 being a center point of the bottom edge of the trailer bounding box 144a. The trailer tracker 172a and the motion correction system 180 align the fore-aft axis Y of the tow vehicle 100 with the bounding box center 145 that includes the trailer 200. In some implementations, as shown in FIG. 4, the trailer tracker 172a determines a bounding box hit line 400 that is positioned at a predefined distance from the trailer 200. Therefore, at block 312, while the tow vehicle 100 is autonomously maneuvering in the rearward direction R towards the trailer 200, the trailer tracker 172a checks if the tow vehicle 100 has reached the bounding box hit line 400. If the trailer tracker 172a determines that the tow vehicle 100 has reached the bounding box hit line 400, then trailer tracker 172a instructs the drive assistance system 190 and/or the drive system 110 to stop the tow vehicle 100 as shown in block 314. Following, at block 316, the user interface 130 by way of the display 140, solicits from the driver, an input of a coupler bounding box 144b around a coupler representation 502 of the trailer coupler 212 with the image 151 as shown in FIGS. 5A and 5B. In some examples, at block 316, the image 151 captures a closer view of the trailer 200 and the coupler 212 due to the location of the tow vehicle 100 being at the bounding box hit line 400. Additionally, the driver may zoom in the image 151 before inputting the bounding box 144b around the trailer coupler 212 to provide a more accurate coupler bounding box 144b around the coupler representation 502.

At block 318, the coupler tracker 172b identifies the location of the coupler representation 502 within the image 151 based on the selected coupler bounding box 144b. At block 320, the driver indicates that his selection of the coupler representation 502 is complete by way of the user interface 130 or the driver puts the tow vehicle 100 in reverse gear causing the tow vehicle 100 to continue its autonomous maneuvering towards the coupler 212 associated with the coupler representation 502 within the bounding box 144b at block 322. During the autonomous maneuvering, the motion correction system 180 determines and implements corrective steering angles that maintain that the vehicle 100 maneuvers towards the towards the coupler 212 associated with the selected coupler bounding box 144b. The coupler tracker 172b and the motion correction system 180 align the fore-aft axis Y of the tow vehicle 100 with the box center 145 of the coupler bounding box 144b bottom edge that includes the coupler 212. In some examples, the controller 160 further processes the image 151 that includes the coupler 212 to increase robustness against the shadows, more precisely when the coupler 212 is in the sunlight and enters the shadow during the maneuver. For example, a transformation (E.G., Bayer transformation, CLAHE or Affined transformations) is performed around the coupler bounding box 144b to improve features and then introduced back into the original image. The resulting image is then used by the coupler tracker 172b to track the coupler 212. In some implementations, as shown in FIG. 5B, the coupler tracker 172b identifies the vehicle tow ball 122 within the image 151 and generates a tow ball bounding circle 504 around the vehicle tow ball 122. At block 324, the coupler tracker 172b determines if the bounding box 144b reaches or overlaps the bounding circle 504. Once the coupler tracker 172b determines that the bounding box 144b reaches or overlaps the bounding circle 504, then the trailer tracker 172a instructs the drive assistance system 190 and/or the drive system 110 to stop the tow vehicle 100 as shown in block 326.

In some implementations, the hitch assist system 170 executes a vehicle motion estimator 174 in addition to the tracker 172 to improve the accuracy of the tracker 172 and thus the motion correction system 180 while maneuvering the tow vehicle 100 in the rearward direction R. The vehicle motion estimator 174 receives wheel ticks 155 from the wheel encoder 154 and steering wheel angle data 157 from the steering wheel angle sensor 156 and determines a vehicle position, a vehicle heading, a vehicle speed, and a vehicle angular speed. The tracker 172 (i.e., the trailer tracker 172 and the coupler tracker 172b) may use the data from the vehicle motion estimator 174 to improve its tracking of the trailer 200 or the trailer coupler 212 as the tow vehicle 100 is autonomously maneuvering in the rearward direction R. In some examples, the tracker output data and the vehicle motion estimation output data are fused together and the motion correction system 180 relies on the fused data to determine the vehicle maneuvers towards the trailer 200 or coupler 212.

Referring back to FIG. 2, the vehicle controller 160 executes the motion correction system 180 that determines and implements corrective steering angles that cause the vehicle 100 to keep autonomously maneuvering towards the bounding box 144, 144a, 144b. As the tow vehicle 100 is autonomously maneuvering towards the bounding box 144, the motion correction system 180 adjusts vehicle autonomous maneuvers based on continuously receiving sensor data and tracked data. In some examples, an object detection system identifies one or more objects between the vehicle 100 and the trailer 200 and sends the motion correction system 180 data relating to the position of the one or more objects. In this case, the motion correction system 180 adjusts the vehicle autonomous maneuvers to avoid the one or more objects. In some examples, the motion correction system 180 determines a probability of collision and if the probability of collision exceeds a predetermined threshold, the motion correction system 180 adjusts the vehicle autonomous motion maneuvers and sends it to the drive assistance system 190.

Once the motion correction system 180 determines the vehicle autonomous motion maneuvers, then the vehicle controller 160 executes a drive assistance system 190, which in turn includes autonomous behaviors 192. The autonomous behaviors 192 receive the vehicle autonomous motion maneuvers and executes one or more behaviors 192a-b that send commands/instructions 191 to the drive system 110, causing the vehicle 100 to autonomously drive based on the vehicle autonomous motion maneuvers, which causes the vehicle 100 to autonomously drive towards the bounding box 144, 144a, 144b.

The autonomous behaviors 192a-b may include one or more behaviors, such as, but not limited to, a braking behavior 192a, a speed behavior 192b, and a steering behavior 192c. Each behavior 192a-b causes the tow vehicle 100 to take an action, such as driving backward, turning at a specific angle, breaking, speeding, slowing down, among others. The vehicle controller 160 may maneuver the tow vehicle 100 in any direction across the road surface by controlling the drive system 110, more specifically by issuing a signal, command, or instructions 191 to the drive system 110.

The braking behavior 192a may be executed to either stop the vehicle 100 or to slow down the vehicle 100 based on the vehicle autonomous maneuvers. The braking behavior 192a sends a signal, command, or instructions 191 to the drive system 110, e.g., the brake system (not shown), to either stop the tow vehicle 100 or reduce the speed of the tow vehicle 100.

The speed behavior 192b may be executed to change the speed of the tow vehicle 100 by either accelerating or decelerating based on the vehicle autonomous maneuvers. The speed behavior 192b sends a signal, command, or instructions 191 to the brake system 114 for decelerating or the acceleration system 116 for accelerating.

The steering behavior 192c may be executed to change the direction of the tow vehicle 100 based on the vehicle autonomous maneuvers. As such, the steering behavior 192c sends the acceleration system 116 a signal, command, or instructions 191 indicative of an angle of steering causing the drive system 110 to change direction.

As previously discussed, the controller 160 executes the hitch assist system 170, the motion correction system 180, and the drive assistance system 190 in real time. Therefore, the described system provides an automated method that needs limited driver input.

Figure 6:
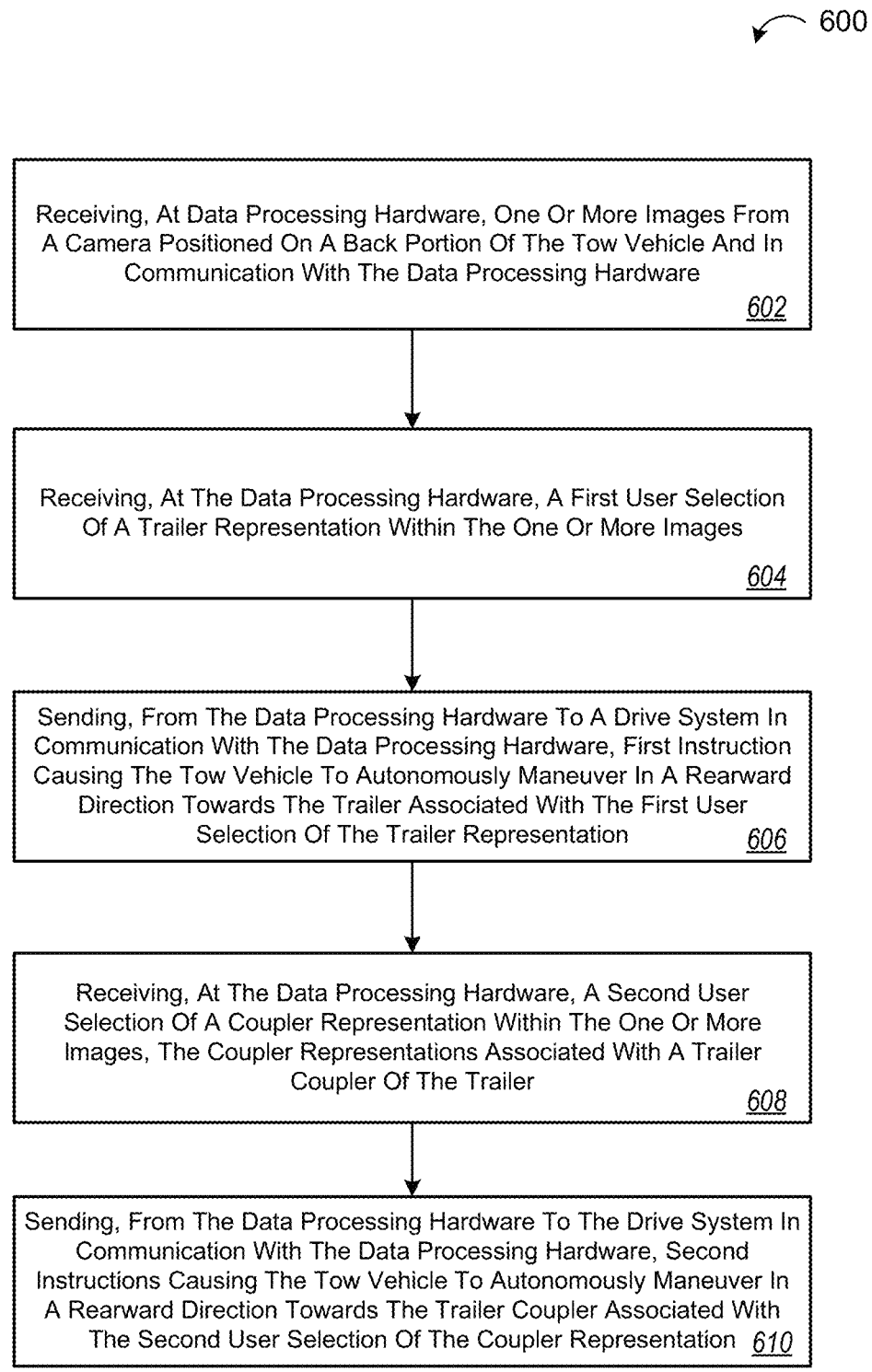
FIG. 6 is a schematic view of an exemplary arrangement of operations for autonomously maneuvering a tow vehicle towards a trailer positioned behind the tow vehicle.

FIG. 6 provides an example arrangement of operations of a method 600 for autonomously maneuvering a vehicle 100 (e.g., a tow vehicle) in a rearward direction R towards a selected trailer 200, using the system described in FIGS. 1-5B. At block 602, the method 600 includes receiving, at data processing hardware 162, one or more images 151 from a camera 152 positioned on a back portion of the tow vehicle 100 and in communication with the data processing hardware 162. At block 604, the method 600 includes receiving, at the data processing hardware 162, a first user selection (e.g., a trailer bounding box 144, 144a) of a trailer representation 146 within the one or more images 151. At block 606, the method 600 includes sending, from the data processing hardware 162 to a drive system 110 in communication with the data processing hardware 162, first instructions 191 causing the tow vehicle 100 to autonomously maneuver in a rearward direction R towards the trailer 200 associated with the first user selection 144a of the trailer representation 146. At block 608, the method 600 includes receiving, at the data processing hardware 162, a second user selection (e.g., a coupler bounding box 144, 144b) of a coupler representation 502 within the one or more images 151. The coupler representation 502 associated with a trailer coupler 212 of the trailer 200. At block 610, the method 600 includes sending, from the data processing hardware 162 to the drive system 110, second instructions 191 causing the tow vehicle 100 to autonomously maneuver in a rearward direction R towards the trailer coupler 212 associated with the second user selection 144b of the coupler representation 502.

In some implementations, the method 600 includes tracking the trailer bounding box 144a within the one or more images as the tow vehicle autonomously maneuvers in the rearward direction towards the trailer associated with the first user selection of the trailer representation. The method 600 also includes tracking the coupler bounding box 144b within the one or more images 151 as the tow vehicle 100 autonomously maneuvers in the rearward direction R towards the trailer coupler 212 associated with the second user selected 144b of the coupler representation 502. The method 600 may also include, receiving wheel tick sensor data 155 from one or more wheel encoders 154 and steering wheel angle data 157 from a steering wheel angel sensor 156. The method 600 includes determining a vehicle position based on the wheel tick sensor data 155 and the steering wheel angle data 157 adjusting the first and/or second instructions 191 based on the tow vehicle position relative to the trailer and the coupler respectively.

In some implementations, the method 600 includes determining a tow ball position of a tow ball 122 of the tow vehicle 100. During autonomous maneuver of the tow vehicle 100 in the rearward direction R, the method 600 includes determining a longitudinal distance $D_{Lg}$ and a lateral distance $D_{Lt}$ between the tow ball and a center of a trailer bounding box 144a or a coupler bounding box 144b, where the center 145 is a center of a bottom of the trailer bounding box 144a or the coupler bounding box 144b. In some examples, the first and second instruction cause the longitudinal distance $D_{Lg}$ and a lateral distance $D_{Lt}$ to decrease.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of autonomously maneuvering a tow vehicle towards a trailer positioned behind the tow vehicle, the method comprising:
receiving, at data processing hardware, one or more images from a camera positioned on a back portion of the tow vehicle and in communication with the data processing hardware;

receiving, at the data processing hardware, a first user selection of a trailer representation within the one or more images;

sending, from the data processing hardware to a drive system in communication with the data processing hardware, first instructions causing the tow vehicle to autonomously maneuver in a rearward direction towards the trailer associated with the first user selection of the trailer representation;

receiving, at the data processing hardware, a second user selection of a coupler representation within the one or more images, the coupler representation associated with a trailer coupler of the trailer; and sending, from the data processing hardware to the drive system, second instructions causing the tow vehicle to autonomously maneuver in the rearward direction towards the trailer coupler associated with the second user selection of the coupler representation, wherein the second user selection includes a coupler bounding box surrounding the coupler representation, and receiving the second user selection of the coupler representation comprises receiving, from a display screen of the tow vehicle, the bounding box that is received at the display screen as input from a vehicle occupant.

2. The method of claim 1, wherein the first user selection includes a trailer bounding box surrounding the trailer representation.

3. The method of claim 1, further comprising:
tracking the first user selection within the one or more images as the tow vehicle autonomously maneuvers in the rearward direction towards the trailer associated with the first user selection of the trailer representation; and
tracking the second user selection within the one or more images as the tow vehicle autonomously maneuvers in the rearward direction towards the trailer coupler associated with the second user selection of the coupler representation.

4. The method of claim 3, further comprising:
receiving wheel tick sensor data and steering wheel angle data from a sensor system in communication with the data processing hardware; and
determining a vehicle position based on the wheel tick sensor data and the steering wheel angle data; and
adjusting the first and/or second instructions based on the tow vehicle position relative to the trailer and the trailer coupler respectively.

5. The method of claim 1, further comprising:
determining a tow ball position of a tow ball of the tow vehicle;
during autonomous maneuver of the tow vehicle in the rearward direction, determining a longitudinal distance and a lateral distance between the tow ball position and a center of a trailer bounding box or the coupler bounding box, where the center is a center of a bottom of the trailer bounding box or the coupler bounding box.

6. The method of claim 5, wherein the first and second instructions cause the longitudinal distance and the lateral distance to be decreased.

7. The method of claim 1, further comprising:
prior to receiving the second user selection of the coupler representation, sending, by the data processing hardware to the display screen of the tow vehicle, instructions to display the one or more images;

receiving, by the data processing hardware, user instructions to change a magnification level of the one or more images displayed by the display screen; and
sending, by the data processing hardware, instructions to display one or more modified versions of the one or more images on the display screen based upon the user instructions to change a magnification level of the one or more images.

8. A system for autonomously maneuvering a tow vehicle towards a trailer positioned behind the tow vehicle, the system comprising:
data processing hardware in communication; and
memory hardware in communication with the data processing hardware, the memory hardware storing instructions that when executed on the data processing hardware cause the data processing hardware to perform operations comprising:
receiving one or more images from a camera positioned on a back portion of the tow vehicle and in communication with the data processing hardware;
receiving a first user selection of a trailer representation within the one or more images;
sending first instructions to a drive system causing the tow vehicle to autonomously maneuver in a rearward direction towards the trailer associated with the first user selection of the trailer representation;
receiving a second user selection of a coupler representation within the one or more images, the coupler representation associated with a trailer coupler of the trailer; and
sending second instructions to the drive system causing the tow vehicle to autonomously maneuver in the rearward direction towards the trailer coupler associated with the second user selection of the coupler representation;
determining a tow ball position of a tow ball of the tow vehicle; and
during autonomous maneuver of the tow vehicle in the rearward direction, determining a longitudinal distance and a lateral distance between the tow ball position and a center of a trailer bounding box or a coupler bounding box, where the center is a center of a bottom of the trailer bounding box or the coupler bounding box.

9. The system of claim 8, wherein the first user selection includes a trailer bounding box surrounding the trailer representation.

10. The system of claim 8, wherein the second user selection includes a coupler bounding box surrounding the coupler representation.

11. The system of claim 8, wherein the operations further include:
tracking the first user selection within the one or more images as the tow vehicle autonomously maneuvers in the rearward direction towards the trailer associated with the first user selection of the trailer representation; and
tracking the second user selection within the one or more images as the tow vehicle autonomously maneuvers in the rearward direction towards the trailer coupler associated with the second user selection of the coupler representation.

12. The system of claim 11, wherein the operations further include:
receiving wheel tick sensor data and steering wheel angle data from a sensor system in communication with the data processing hardware; and determining a vehicle position based on the wheel tick sensor data and the steering wheel angle data; and adjusting the first and/or second instructions based on the tow vehicle position relative to the trailer and the trailer coupler respectively.

13. The system of claim 8, wherein the first and second instructions cause the longitudinal distance and the lateral distance to be decreased.

14. The system of claim 8, wherein the operations further include:

prior to receiving the second user selection of the coupler representation, sending, by the data processing hardware to a display screen of the tow vehicle, instructions to display the one or more images;

receiving, by the data processing hardware, user instructions to change a magnification level of the one or more images displayed by the display screen; and sending, by the data processing hardware, instructions to display one or more modified versions of the one or more images on the display screen based upon the user instructions to change a magnification level of the one or more images.

15. The system of claim 8, wherein the second user selection includes the coupler bounding box surrounding the coupler representation, and receiving the second user selection of the coupler representation comprises receiving, from a display screen of the tow vehicle, the bounding box that is received at the display screen as input from a vehicle occupant.

* * * * *